No. 746,926. Patented December 15, 1903.

UNITED STATES PATENT OFFICE.

EDWARD CULMANN, OF BUFFALO, NEW YORK, ASSIGNOR TO SCHOELLKOPF, HARTFORD & HANNA COMPANY, OF BUFFALO, NEW YORK.

ORANGE TO YELLOW BROWN SULFUR DYE AND PROCESS OF MAKING SAME.

SPECIFICATION forming part of Letters Patent No. 746,926, dated December 15, 1903.

Application filed April 7, 1903. Serial No. 151,464. (Specimens.)

*To all whom it may concern:*

Be it known that I, EDWARD CULMANN, a citizen of the Swiss Republic, and a resident of Buffalo, in the county of Erie and State of New York, have invented a new and useful Improvement in Orange and Yellowish Brown Sulfur Dyes and Methods of Making Same, of which the following is a specification.

I have found that very valuable dyestuffs can be obtained by heating the sulfo-acids of toluylenediamin—for instance, the acid 1, 2, 6, 4 or the acid 1, 2, 4, 5—or other hereinmentioned sulfo-acids with sulfur and sodium sulfid under certain conditions, thereby producing dyestuffs which dye cotton directly and produce thereon brown shades ranging from yellowish to orange brown. These dyestuffs can be diazotized on the fiber and combined with amins and phenols, whereby the brown shades are deepened or darkened.

The process can be illustrated by the following example: Forty pounds of touyllenediaminsulfo-acid, fifteen pounds of soda, thirty pounds of sulfur, and one hundred and twenty pounds of sodium sulfid are heated in a shallow vessel under constant stirring to a temperature of about 120° to 130° centigrade and evaporated nearly to dryness. The mass is then put in shallow covered pans and baked in an oven for about four hours at about 250° centigrade. The product thus obtained is ground and forms a dark-brown powder which can be used directly for dyeing.

The toluylenediaminsulfo-acid can be replaced by the amidotoluyloxaminsulfo-acids described in United States Letters Patent Nos. 659,496 and 659,497, granted October 9, 1900, to Schoellkopf, Hartford & Hanna Company. The dinitro acid corresponding with the toluylenediaminsulfo-acid 1, 2, 6, 4 can be used instead of said acid, whereby a more yellowish-brown shade is produced.

The dyestuff obtained from toluylenediaminsulfo-acid 1, 2, 6, 4 is soluble in water with an orange-brown color. An addition of acid to the solution produces a yellowish-brown precipitate which is soluble in concentrated sulfuric acid with a yellowish-brown color. With an addition of sodium sulfid and common salt this dyestuff dyes cotton an orange-brown shade. The dyestuff obtained from the corresponding oxamin acid dyes cotton a somewhat redder brown.

The dyestuff obtained from toluylenediaminsulfo-acid 1, 2, 4, 5 is soluble in water with a yellowish-brown color. An addition of acid produces a brown precipitate. In concentrated sulfuric acid this dyestuff is soluble with a dark reddish-brown color. This dyestuff with the addition of sodium sulfid and common salt dyes cotton a light yellowish brown. The dyestuff obtained from the corresponding oxamin acid dyes cotton a dark yellowish brown.

I claim as my invention—

1. The herein-described new brown dyestuffs obtainable from the herein-described aromatic sulfo-acids, sulfur and sodium sulfid, said dyestuffs forming dark-brown powders when ground, and being soluble in water, the addition of acid to the solution producing a brown precipitate which is soluble in concentrated sulfuric acid with a yellowish to reddish brown color, and dyeing cotton directly orange and yellowish brown shades.

2. The herein-described method of producing orange and yellowish brown sulfur dyes which consists in subjecting the herein-described aromatic sulfo-acids together with sulfur and sodium sulfid to the action of heat, substantially as set forth.

3. The herein-described method of producing orange and yellowish brown sulfur dyes which consists in evaporating a mixture of the herein-described aromatic sulfo-acids, sulfur and sodium sulfid, and then baking the evaporated mixture, substantially as set forth.

Witness my hand this 3d day of April, 1903.

EDWARD CULMANN.

Witnesses:
NORMAN A. KINNICUTT,
FRED C. BONNET.